Oct. 6, 1936.          L. M. MANLEY          2,056,287
CONTROL DEVICE
Filed Sept. 11, 1935

INVENTOR
L. M. MANLEY
BY
E. R. Nowlan
ATTORNEY

Patented Oct. 6, 1936

2,056,287

UNITED STATES PATENT OFFICE 2,056,287

CONTROL DEVICE

Lloyd M. Manley, Forest Hills, N. Y., assignor to Western Electric Company, Incorporated, New York, N. Y., a corporation of New York Application September 11, 1935, Serial No. 40,099

4 Claims. (Cl. 172—239)

This invention relates to a control device and more particularly to a device to start and stop an electric motor automatically at predetermined intervals.

In various types of machinery it may be desirable to rotate a power drive shaft in one direction of rotation until a certain predetermined amount of work, or number of revolutions, or the like has been accomplished, then to stop the shaft pending a manual or automatic adjustment of some part of the machine, and then to rotate the shaft again in the same or in the reverse direction for the same or another predetermined number of revolutions or amount of work accomplished. For example, an automatic milling machine is ordinarily provided with means to predetermine both the length and direction of a cut to be taken.

An object of the present invention is to provide a simple, reliable and efficient control device to govern the action of an electric motor, acting automatically to cause the motor to run an adjustably predeterminable number of revolutions in either possible direction of rotation predeterminably.

One embodiment of the invention may present an electric switching device operable by tilting, such as a mercury switch, mounted upon a tiltable member supported at either end of the member by vertically adjustably movable means, the means at one end being adjustable manually to a predeterminable extent and the means at the other end being drivably connectible to a motor to be controlled to be moved thereby proportionately to the motion of the motor, together with means actuable by the tilting switch to start, stop and reverse the motor.

Figure 1:
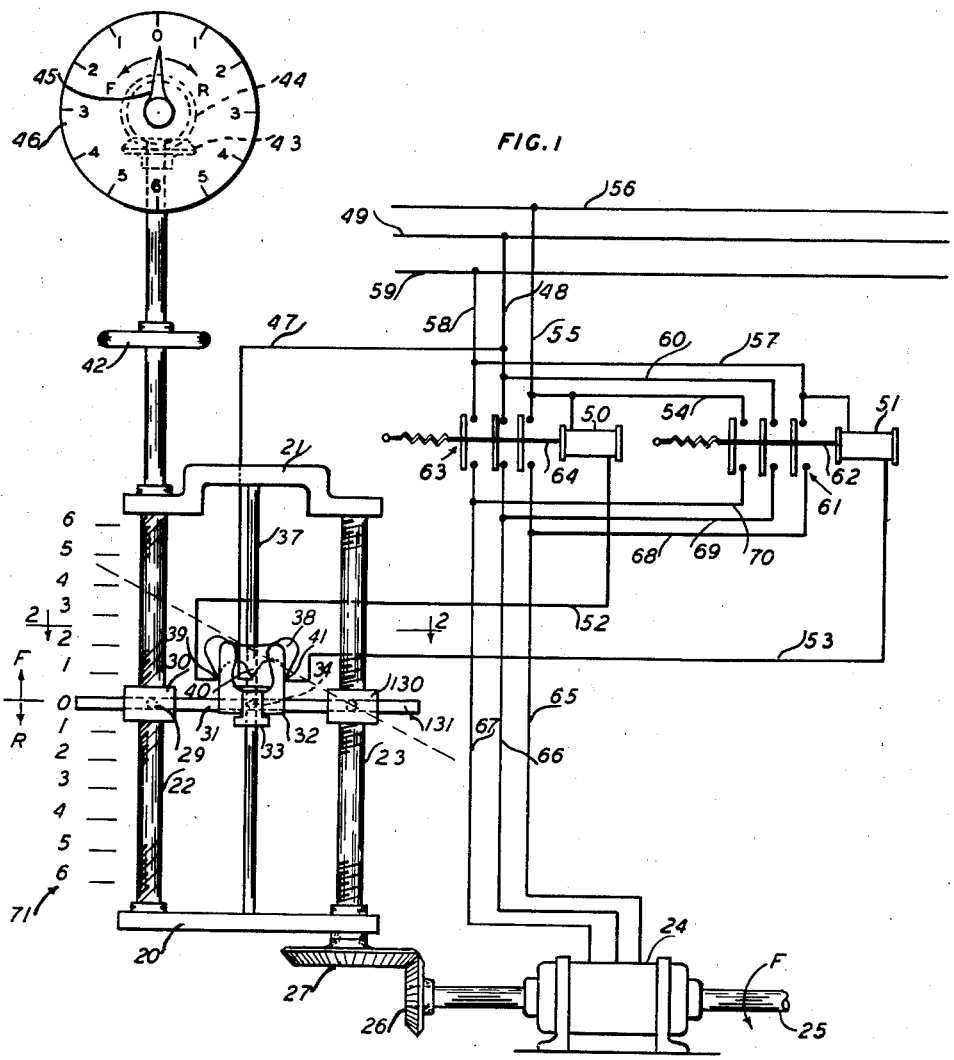
Figure 2:
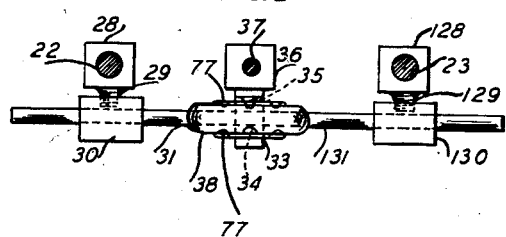

The above and other objects and features of the invention will appear from the following detailed description of one embodiment thereof taken in connection with the accompanying drawing in which the same reference numerals are applied to identical parts in the several figures and in which Fig. 1 is a diagrammatic representation of a motor control device constructed in accordance with the invention, and Fig. 2 is a slightly enlarged sectional view on the line 2—2 of Fig. 1.

In the embodiment of the invention herein disclosed, a roughly oblong framework comprises a horizontal stationary base member 20 and a horizontal stationary yoke 21, spaced apart and held together by two rotatable vertical pillars or shafts 22 and 23 respectively, journalled in the base and yoke with freedom to rotate but not to slide therein. The base and the yoke may further be secured to any suitable fixed supports, not shown. Each of the shafts 22 and 23 is threaded over substantially its whole length between the base and yoke, the thread on shaft 22 being ordinarily of relatively great pitch and that on shaft 23 of relatively small pitch.

A three phase motor 24, to be controlled by the device and having a shaft 25 is mounted near the framework above described, and is connected to the shaft 23 to drive the same by any suitable speed reducing means, here shown as a simple pair of unequal sized bevel gears 26, 27, the smaller gear 26 being on the motor shaft 25 and the larger gear 27 being on the frame shaft 23.

A nut 28 is located on the shaft 22 and has an internal thread complementary to that on the shaft. A screw threaded stub 29 is secured to the front face of the nut, as by welding, and enters a correspondingly threaded bore in a block 30 located in front of the nut 28 and pivotally supported by the stub 29. As the rotation of the block 30 on the stub 29 (hereinafter described) is limited to a fraction of a whole turn, this forms a simple and satisfactory mode of connecting the block 30 pivotally to the nut 28. A rod 31 is mounted in a corresponding transverse bore in the block 30 with freedom to slide therein, and is screw threaded at its right hand end to enter and be held in a correspondingly threaded bore in a switch supporting block 32 located midway between the shafts 22 and 23.

A block 130 identical with block 30 is supported in the same way by a stub 129 and a nut 128 on the shaft 23, and supports in the same way a rod 131, slidable in the block 130 and secured at its left end in the switch block 32, the switch block being thus supported on the nuts 28 and 128. The switch block 32 is pivotally supported in a cradle or stirrup 33 by pivots 34 and 35 formed on the cradle and entering corresponding recesses in the front and rear faces of the block. The rear face of the cradle is secured, as by welding, to the front face of a slide block 36 slidable on a vertical guide rod 37 extending between the base 20 and yoke 21. The switch block 32 is also provided with suitable spring clips or arms 77 to hold a mercury switch tube 38 of well known construction having three terminals, 39, 40 and 41.

The shaft 22 extends through and above the yoke 21 and is provided with a hand wheel 42 or other suitable means for manually rotating the shaft 21 and also has secured to the upper end of the shaft a gear 43 meshing with a gear 44 to which is secured an indicating hand 45 travelling over a dial 46.

Associated with the above described apparatus is electrical means to start, stop and reverse the motor 24, comprising a solenoid 50 and a solenoid 51. The solenoid 50 has one end of its winding connected by a conductor 52 to the left hand outerterminal 39 of the mercury tube 38, while one end of the winding of the solenoid 51 is connected by a conductor 53, to the right hand outer terminal 41 of the mercury tube 38. The middle terminal 40 of the tube is connected by a conductor 47 to a lead 48 connected to one main 49 of three mains of a three phase power circuit.

The other end of the winding of the solenoid 50 is connected to a distributing conductor 54 connected to a lead 55 running from the second main 56 of the power circuit; and the other end of the winding of the solenoid 51 is connected to a second distributing conductor 57 connected to a lead 58 running from the third main 59. A third distributing conductor 60 runs from the lead 48 parallel to the conductors 54 and 57 and these conductors 54, 60 and 57 are connected to the respective terminals of one side of a three pole switch 61 operable by a magnetic core 62 in the solenoid 51; while the three leads 55, 48 and 58 are connected to the respective terminals of a similar switch 63 operable by a magnetic core 64 in the solenoid 50.

The terminals of the other side of the switch 63 are respectively connected to the power intake terminals of the motor 24 by wires 65, 66 and 67, and the terminals of the other side of the switch 61 are connected respectively to the wires 65, 66 and 67 by leads 68, 69 and 70, these connections being so arranged that when the switch 61 is closed allowing power current to pass from the mains 56, 49, 59 to the motor via the leads 68, 69 and 70 the motor will turn say forward or counterclockwise as seen from the right in the direction of the arrow F, while when the switch 63 is closed the motor will run in the reverse direction, it being premised that the motor is such that a reversal of its connections to its power supply will reverse its direction of rotation.

In operation, with the switch tube 38 horizontal as shown in Fig. 1, there is no connection within the tube between any two of its terminals, no current flows through either of the solenoids 50 or 51, both switches 63 and 61 are open, and no power current passes from the mains 56, 49, 59 to the motor, which is, therefore, stationary. Now if it be desired to run the motor forward for a certain predetermined number of revolutions, i. e. to perform a corresponding predetermined amount of work, the hand wheel 42 is rotated clockwise as seen from above until the pointer 45 stands at the corresponding point of the dial 46. The wheel 42 rotates the coarsely threaded shaft 22 within the nut 28, which rises along the shaft a distance proportional to the motion of the pointer. Owing to the rapid motion of the nut on the high pitch thread this adjustment is rapidly made.

The rods 31 and 131 and the block 32 being a rigid unit are tilted to some such position as indicated by the dotted line, the blocks 30 and 130 pivoting on the stubs 29 and 129 and the rods 31 and 131 sliding in the blocks 30 and 130 to permit the tilting. The switch tube 38 is tilted with the block 32 and the mercury therein runs down to the right hand end closing the circuit between the terminals 40 and 41 and allowing current to pass through the winding of the solenoid 51, which closes the switch 61 and thus supplies the motor 24 with power current to run it in the forward direction.

As soon as the motor starts it begins to drive the shaft 23 clockwise as seen from above, and the nut 128 begins to rise along the shaft. This will continue until the nut 128 has risen to the level of the nut 28 when the mercury connection between the terminals 40 and 41 will be broken, breaking the circuit through the winding of the solenoid 51 and allowing the switch 61 to open stopping the motor. The number of revolutions the motor will run from start to stop will be proportional to the distance the nut 128 is driven along the shaft 23 by the motor to bring the nut to a level with the nut 28. The dial 46 may be graduated to read motor revolutions or preferably amount of work to be done by the motor, e. g. the length of cut to be taken by a power tool driven by the motor.

If it be desired to run the motor in reverse for a predetermined number of revolutions, the handwheel 42 is rotated counterclockwise dropping the nut 28 down the shaft 22, closing the circuit through the terminals 39, 40 of the tube 38 and the winding of the solenoid 50, which closes the switch 63 starting the motor in reverse rotation. The motor then drives the shaft 23 in reverse rotation and the nut 128 moves down this shaft until the tube 38 is leveled and breaks the circuit of the solenoid. The switch 63 then opens and the motor stops.

Thus by operation of the handwheel 42 the motor may be caused to start and run in either direction at will to perform an amount of work predetermined by the pointer 45 and dial 46 and then to stop automatically.

Although herein disclosed as embodied in apparatus comprising a three phase motor, a mercury tube switch and a rotary pointer and dial, the invention is not limited to such a construction. The motor may be of any type which reverses on an interchange of its connections to its power supply mains; the switch device mounted on the block 32 may be of any type operable by tilting; and any convenient means for registering the motion of the nut 28 may be used, such for example, as a scale 71 associated directly therewith.

The embodiment of the invention herein disclosed is illustrative only and may be widely departed from and modified in many ways without departing from the spirit and scope of the invention as pointed out in and limited only by the appended claims.

What is claimed is:

1. A device for controlling a reversible electric motor, comprising a vertical rotatable shaft having a screw thread, a nut on the shaft, a second vertical rotatable shaft having a screw thread, a second nut on the second shaft, a member carried by both nuts with freedom to pivot and to slide relatively to each, means manually operable to rotate the first shaft, means operable by the motor to rotate the second shaft, and a mercury tube switch mounted on the member to be operated by the relative motion of the nuts to start and stop the motor.

2. A device for controlling a reversible electric motor, comprising a vertical rotatable shaft having a screw thread, a nut on the shaft, means to indicate motion of the nut, a second vertical rotatable shaft having a screw thread, a second nut on the second shaft, a member carried by both nuts with freedom to pivot and to slide relatively to each, means manually operable to rotate the first shaft, means operable by the motor to run the second shaft, and a mercury tube switch mounted on the member to be operated by the relative motion of the nuts to start and stop the motor.

3. A device for controlling a reversible motor, comprising a plurality of vertical rotatable shafts, a member on each shaft and movable therealong in response to the rotation of the shaft, an element interconnecting and carried by the members with freedom to pivot and slide relatively to each member, means manually operable to rotate one of the shafts, means operable by the motor to rotate another of the shafts, and a mercury tube switch mounted on the element and operable by a relative motion of the members to start and stop the motor.

4. A device for controlling a motor, comprising a pair of rotatable shafts, a member on each shaft and movable therealong in response to the rotation of the shaft, a guide member positioned between the shafts, an interconnecting element carried by the members and operatively connected with the guide member, a switch means carried by the element and operable by relative motions of the members to start and stop the motor, means to rotate one of the shafts, and means driven by the motor to rotate the other shaft.

LLOYD M. MANLEY.